(12) United States Patent
Stanich et al.

(10) Patent No.: US 9,361,554 B2
(45) Date of Patent: Jun. 7, 2016

(54) LOW OVERHEAD NEAR UNITY SCALING TECHNIQUE

(71) Applicants: Mikel John Stanich, Longmont, CO (US); Kartheek Chandu, Longmont, CO (US); Larry M. Ernst, Longmont, CO (US)

(72) Inventors: Mikel John Stanich, Longmont, CO (US); Kartheek Chandu, Longmont, CO (US); Larry M. Ernst, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/498,644

(22) Filed: Sep. 26, 2014

(65) Prior Publication Data

US 2016/0092757 A1     Mar. 31, 2016

(51) Int. Cl.
*G06K 15/02* (2006.01)
*G06T 3/40* (2006.01)

(52) U.S. Cl.
CPC ........ *G06K 15/1843* (2013.01); *G06K 15/1822* (2013.01); *G06T 3/4007* (2013.01); *G06T 3/4023* (2013.01)

(58) Field of Classification Search
CPC .................................. G06K 15/1843
USPC ........................... 358/1.2, 1.9, 2.1
See application file for complete search history.

(56) References Cited

U.S. PATENT DOCUMENTS

| | | | |
|---|---|---|---|
| 4,860,117 A | 8/1989 | Sasaki | |
| 6,024,504 A | 2/2000 | Weichmann et al. | |
| 6,707,578 B1 | 3/2004 | Bradburn | |
| 7,016,757 B2 | 3/2006 | Goldman | |
| 7,946,235 B2 | 5/2011 | Yamada | |
| 8,094,972 B2 | 1/2012 | Perlmutter et al. | |
| 8,098,404 B2 | 1/2012 | Bernal et al. | |
| 8,102,404 B2 | 1/2012 | Schweid | |
| 8,379,066 B2 | 2/2013 | Goerzen | |
| 8,538,199 B2 | 9/2013 | Ernst et al. | |
| 8,547,598 B2 | 10/2013 | Wang et al. | |
| 8,602,791 B2 | 12/2013 | Weatherhead | |
| 2007/0172270 A1* | 7/2007 | Jorgens | G03G 15/011 399/320 |
| 2008/0089585 A1 | 4/2008 | Yashima et al. | |
| 2008/0238966 A1* | 10/2008 | Nishihara | B41J 2/04581 347/11 |
| 2010/0027876 A1 | 2/2010 | Avidan et al. | |
| 2010/0086207 A1 | 4/2010 | Bernal | |
| 2011/0102851 A1* | 5/2011 | Baeumler | G06K 15/408 358/3.26 |
| 2011/0273730 A1 | 11/2011 | Loce et al. | |
| 2012/0076439 A1 | 3/2012 | Kurigata | |

OTHER PUBLICATIONS

EP Search Report, EP15184767, Feb. 4, 2016, 8 pages.

* cited by examiner

*Primary Examiner* — Jacky X Zheng
(74) *Attorney, Agent, or Firm* — Blakely, Sokoloff, Taylor & Zafman LLP

(57) ABSTRACT

A printer is described having a control unit and/or image processor to determine a number of pixels by which to scale an image along an axis of the image, wherein, the scaling of the image is less than 10% of the image along the axis. The control unit and/or image processor is also to identify locations along the axis equal to the number. The control unit and/or image processor is also to remove a region of more than one pixel along the axis at each of the locations. The control unit and/or image processor is also to insert a region of more than one pixel along the axis at each of the locations, where, a difference between pixels removed and pixels inserted accounts for the number.

20 Claims, 9 Drawing Sheets

405     406     407
 ↓       ↓       ↓

0.6667  0.3333  0.0000  ← 401

0.0000  0.3333  0.6667  ← 402

LOW OVERHEAD NEAR UNITY SCALING TECHNIQUE

CROSS REFERENCE TO RELATED APPLICATIONS

This application is related to U.S. patent application Ser. No. 14/498,681 filed on Sep. 26, 2014 and entitled "An Intelligent Pixel Location Selection Process For A Low Overhead Near Unity Scaling Technique".

FIELD OF INVENTION

The field of invention pertains generally to printer technology and more specifically to a low overhead near unity scaling technique

BACKGROUND

Ink-jet or other types of printers may have occasion to make a modest adjustment to the scaling of the image it is printing. An example is an ink-jet printer that accounts for changes in paper size in response to the wetting of the paper by the ink. Here, an ink-jet printer may initially print a first color component of an image on the paper (e.g., the black component of the image). As a consequence of the wetting of the paper by the first color component's ink the paper may expand which expands the size of the printed first color component of the image.

The printer then accounts for this expansion by slightly magnifying the size of the image of the next, second color component it will print (e.g., a red color component). Typically the magnification will be less than 10% or 5% and is often as low as 2 or 3% or even less. Scaling changes of such a small magnitude are referred to as "near unity" scaling.

Prior art near unity scaling processes adjust the size of each image plane to accurately match the previously printed color plane. This provides accurate color registration between the color planes but may not provide absolute accuracy. Another technique applies the scaling to every color plane, including the first, to accurately obtain the correct image size for the final print as it exits the printer system. This operates on an absolute basis to account for each expansion and shrinkage that may occur during each step of the process. In this second implementation scaling may include "mini-fication", where the scaling ratio is less than one.

Near unity scaling can be positive or negative. In the case of positive scaling the size of the image is made to be larger and the scaling ratio is larger than one. In the case of negative scaling the size of the image is made to be smaller and consequently the scaling ratio is less than one.

A problem with near-unity scaling, however, is that the task of adjusting the size of an image traditionally views the image "as a whole" which necessarily attempts to account for every pixel in the image. Such an approach is generally too numerically intensive to perform. Alternatively, if some form of low overhead processing approach is taken to reduce the number of computations, the image quality suffers.

FIG. 1 demonstrates a prior art "low overhead" negative scaling approach. In the approach of FIG. 1, the image is supposed to be reduced in size by a small amount. For example, the image may originally consist of 512 by 512 pixels and need to be reduced to 500×500 pixels. For simplicity, only negative scaling along the horizontal axis is depicted.

The scaling reduction is understood to be accomplished if only 12 columns of pixels are removed. As such, the image is divided into twelfths widthwise and one pixel location at the boundary between neighboring twelfths is chosen for elimination from the image. The problem is that even though the elimination of only 12 columns of pixels seems like a negligible reduction of data, for many images the removed data it is easily detectable as a distortion to the human eye. This is essentially "nearest neighbor" scaling applied in a case with a small scaling ratio where data is deleted.

A similar approach and result also exists in the case of positive scaling. Here, for instance, imagine the original image is 500×500 pixels and needs to be scaled up to 512×512 pixels. Again, the task of magnification is understood to be accomplished if only 12 columns of pixels can be added to the image. As such, the image is divided into twelfths widthwise and one pixel location at each boundary between neighboring twelfth sections is chosen as a location where a column of pixels is to be added to the image.

Here, the "nearest neighbor" approach inserts columns of pixels simply by replicating the values of one of its neighboring column of pixels (e.g., the column of pixels on the immediate left or right of the inserted column). Again, although this seems like negligible addition of data, for many images the added data is easily detectable as a distortion to the human eye.

FIGURES

A better understanding of the present invention can be obtained from the following detailed description in conjunction with the following drawings, in which:

FIG. 1 pertains to a prior art modest scaling process;

FIG. 2 pertains to an improved modest scaling process;

Figure 7:
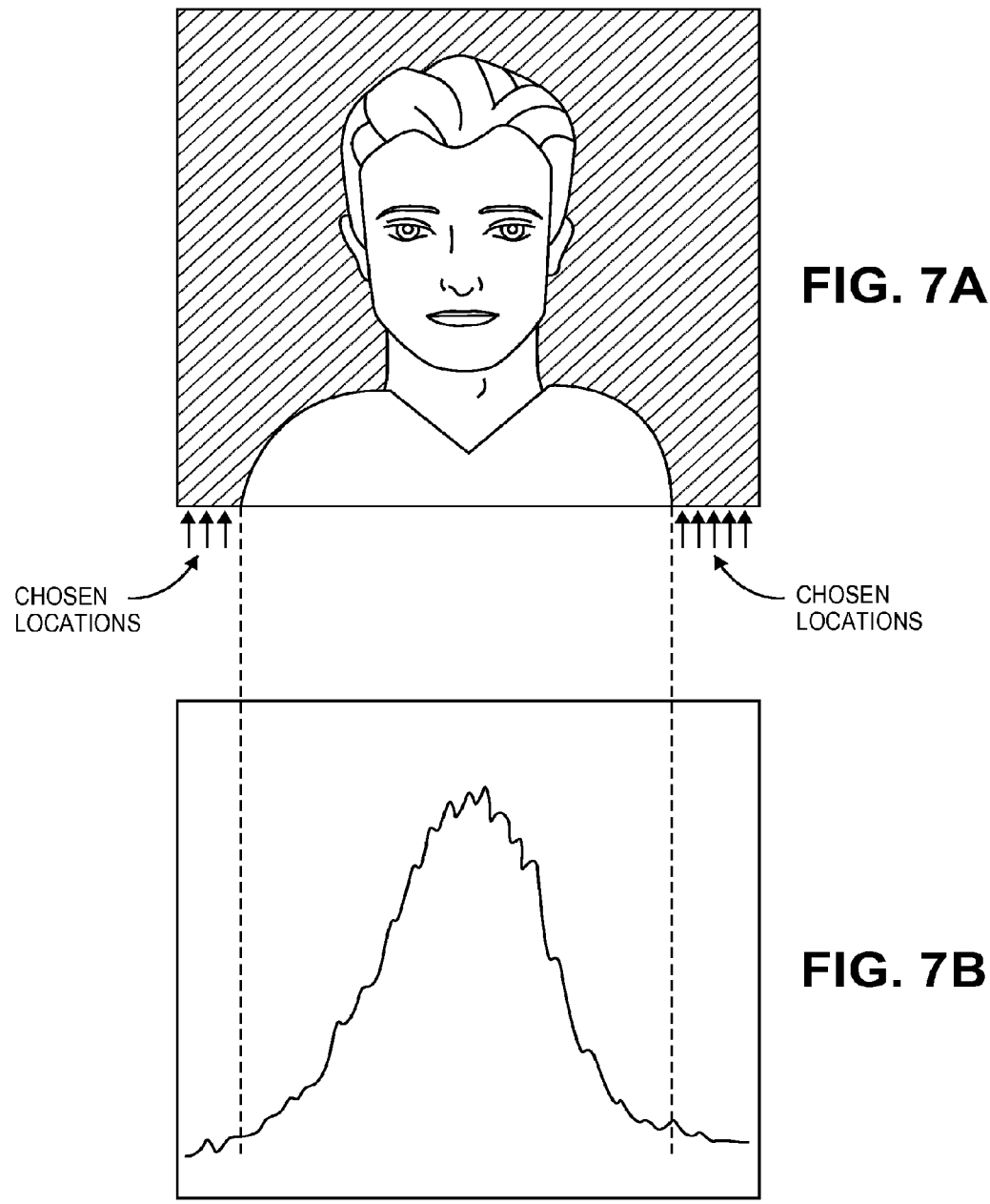

FIG. 7*a* shows an exemplary image;

FIG. 7*b* shows a representation of a gradient vector for the exemplary image of FIG. 7*a;*

Figure 8:
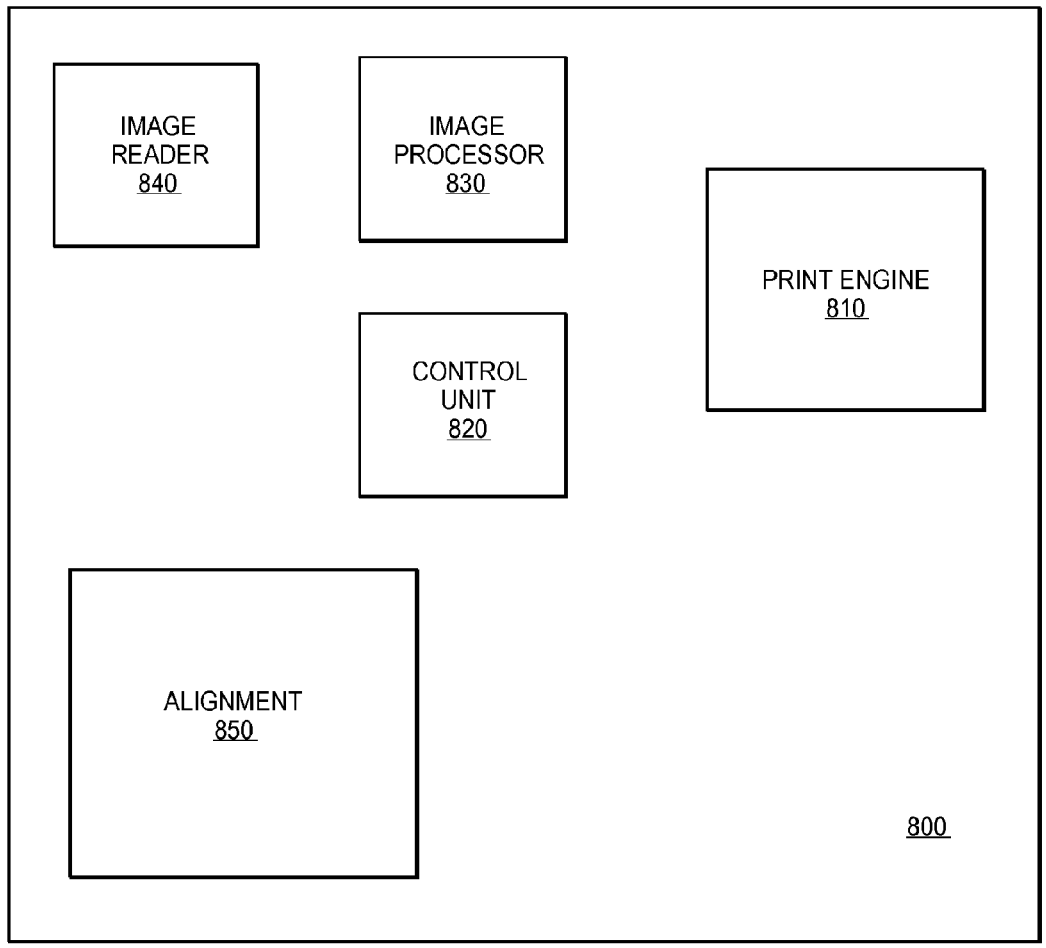
Figure 9:
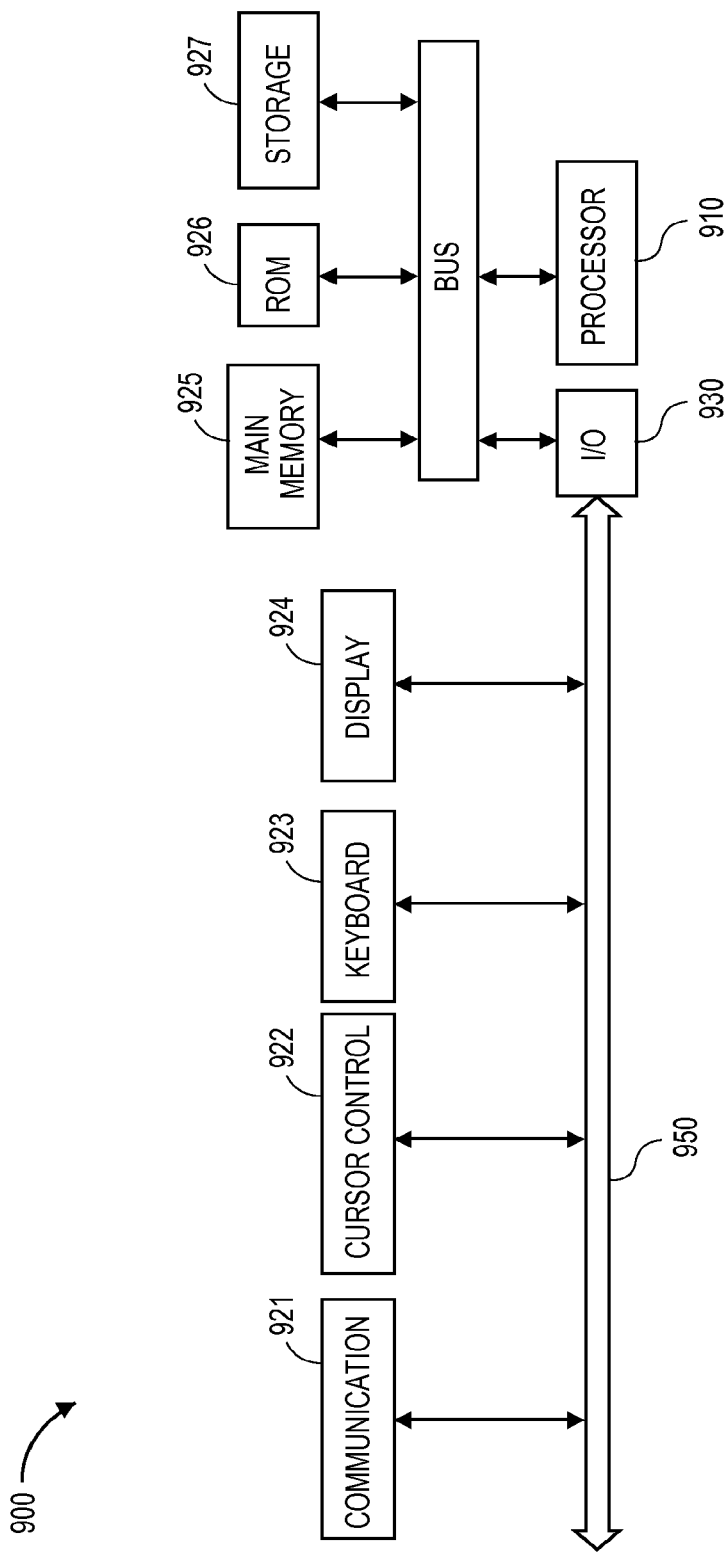

FIG. 8 illustrates an embodiment of a printer;

FIG. 9 illustrates an embodiment of a computing system.

DETAILED DESCRIPTION

Figure 2:
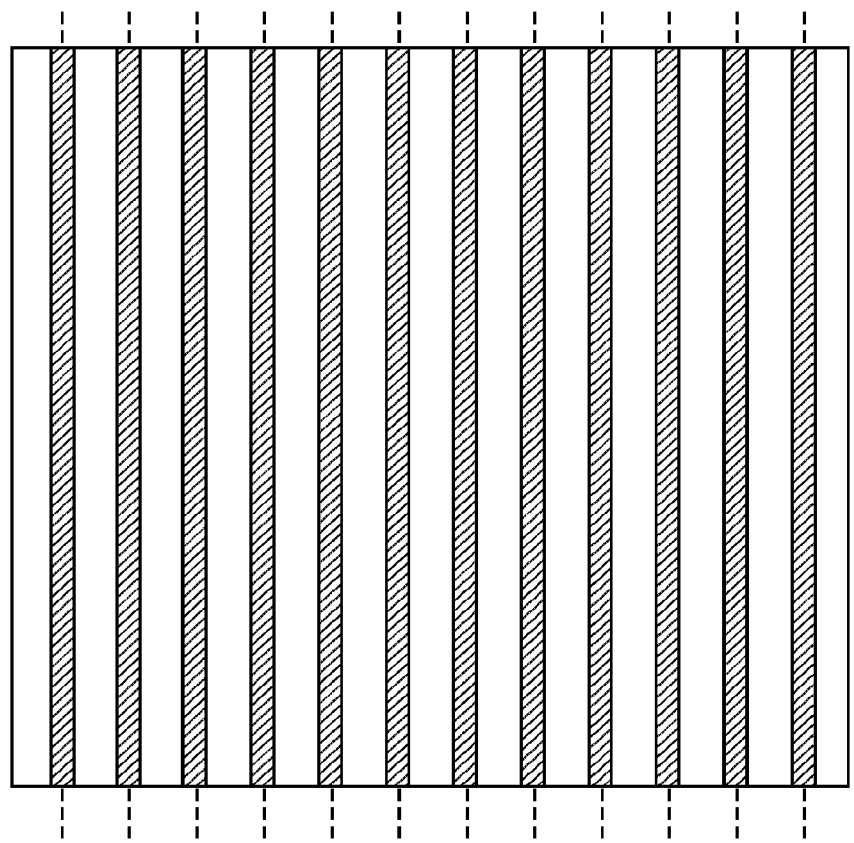

FIG. 2 shows a depiction of an improved approach. As observed in FIG. 2, rather than choose one dimensional "slices" of single pixel width columns for deletion (in the case of negative scaling) or addition (in the case of positive scaling), instead, larger, multi-pixel width columns (blocks) are chosen for modification in the case of negative or positive scaling.

In the case of negative scaling, new, smaller pixel width regions are inserted where larger pixel width regions previously existed in the original image. The difference in the pixel width as between the two regions and the number of such regions determines the number of pixels that are eliminated. For example, if the eliminated regions have a width of 3 pixels, the width of the added regions have a width of 2 pixels and there are twelve such regions, then, the overall image will be reduced in width by 12 pixels (one for each pair of eliminated and inserted regions).

In the case of positive scaling, new, larger pixel width regions are inserted where smaller pixel width regions previously existed in the original image. The difference in the pixel width between the two regions and the number of such regions, determines the number of pixels that are added. For example, if the target regions have a width of 2 pixels, the width of the new replacement regions have a width of 3 pixels and there are twelve such regions, then, the overall image will be increased in width by 12 pixels.

Figure 1:
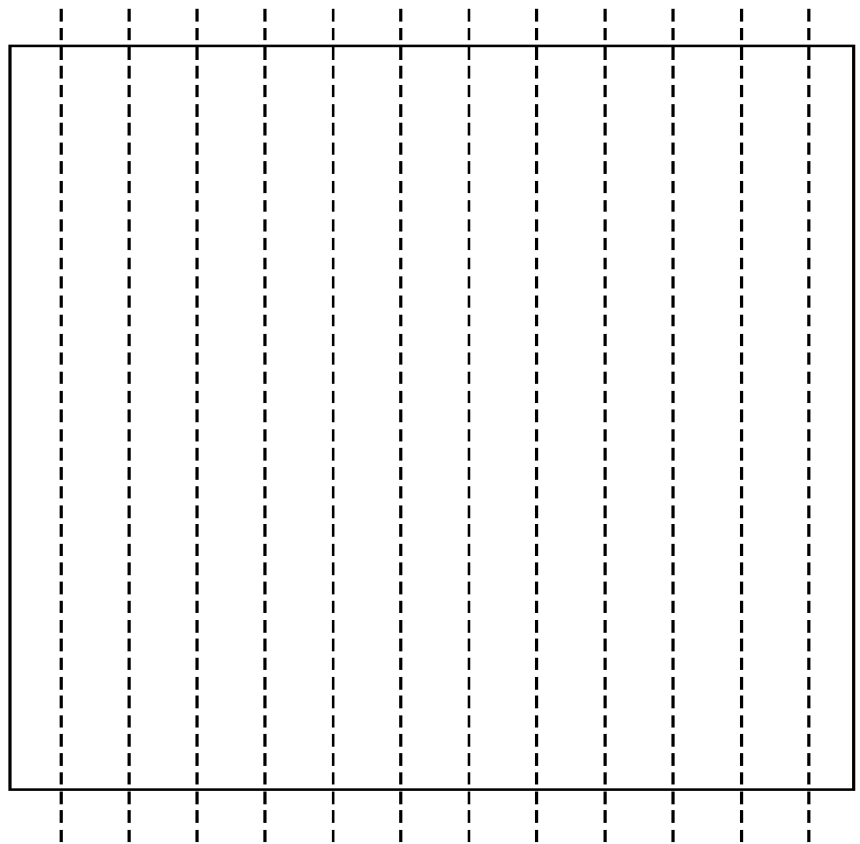

The use of multi-pixel width columns imparts changes to the image that span larger regions of the image, rather than mere single pixel wide line changes, as is done in the prior art approach discussed above with respect to FIG. 1. The replacement by a larger or smaller number of columns of image data with a limited number of such two-dimensional regions avoids the extensive numerical computations associated with attempting to resize the "image as a whole" where every pixel of the image is modified. At the same time, the replacement of two-dimensional regions, as opposed to the insertion/deletion of single pixel lines, provides for an opportunity to "smooth-out", over the two-dimensional regions, the visual abruptness of the change in the image being made which the prior art approach of FIG. 1 does not. That is, the insertion/deletion approach of FIG. 1 is not able to correct for the visual differences that exist in the imagery that exist within the columns where the insertions/deletions are made. In the case of the prior art method and the improved method described herein, in various embodiments, the process used to select the rows or columns of data on which to operate is a one dimensional (1D) process. Applying this process first along columns and then along rows allows the scaling ratios for each direction to be different. While the modification process is 1D the data being operated upon is two dimensional (2D).

By contrast, the replacement approach of FIG. 2 provides some area over which the image can be modified to provide an accurate rendering over that portion of the entire image. As a consequence, a smoother presentation is made to the human eye. Said more simply, the use of images rather than lines provides some surface area over which to blend the imagery to that which exists on both sides of the insertion location.

Figure 3:
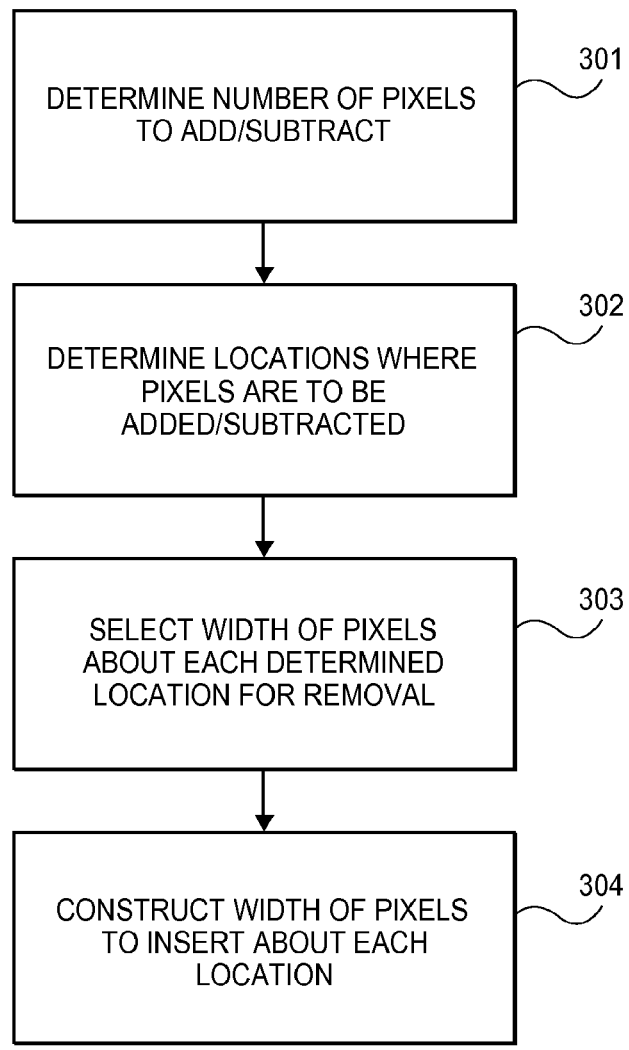
FIG. 3 shows a flow diagram of an improved modest scaling process.

FIG. 3 provides a flow diagram of an embodiment of the new approach. As observed in FIG. 3, the number of pixels needed to effect the scaling is determined 301. In the case of negative scaling, the number of pixels corresponds to the number of pixels that need to be eliminated from the image. In the case of positive scaling, the number of pixels corresponds to the number of pixels that need to be added to the image.

In an embodiment, the number of pixels (as well as the entire process outlined in FIG. 3) is performed along one dimension (e.g., either the horizontal or vertical dimension). Keeping the aspect ratio the same as between the original un-scaled image and the final, scaled image necessarily involves changing the number of pixels in both dimensions (horizontal and vertical). For example, for a 512×512 pixel image, a determination may be made that the image needs to be reduced by approximately 2.3%, which, in turn, corresponds to a new image having dimensions of 500×500 pixels.

To properly scale the whole image the process of FIG. 3 is executed for one dimension (e.g., horizontal) and then again for the other dimension (e.g., vertical). Each of the separate executions of process 301 will therefore identify "12" as the number of pixels that need to be removed from the image (i.e., 12 pixels along the horizontal axis and 12 pixels along the vertical axis).

The determination that an image needs to be scaled by some modest percentage can be made, for example, by a central processing unit (CPU), controller, micro-controller or other form of processing intelligence within the printer that controls the imagery being printed by the printer. The decision to scale an image may be made, as alluded to in the background, to account for changes in paper size during the printing of an image by an ink-jet printer where the change in paper size occurs as a consequence of the paper's absorption of ink during the printing of the image. Here, the amount of change may be based on a numerical model contained within the printer that calculates an amount of paper width expansion based on the printed image data, or, based on sensors that detect the actual size of the printed image after the paper has expanded. The scaled "image" may be a color component of a larger composite image. For example, the initial printing of a first color component (e.g., black) may cause the paper to expand. The remaining color components that are printed (e.g., cyan, magenta and yellow) are then positively scaled before being printed to match and account for the initial paper expansion.

Another example of the need to scale an image is where a single image is to be sequentially printed on more than one page, the sizes of the pages of paper are slightly different and the image is scaled to fit to the pages. Here, images printed on smaller paper may need to be negatively scaled as compared to their counterpart images printed on larger pages.

Referring again to the process of FIG. 3, once the number of pixels have been determined, the general locations in the image where the new pixels are to be added or the existing pixels are to be deleted are determined 302. This process points to each region where modifications are required and does not specify the precise location. For example this process can point to the first column, middle column or last column of the block of image data to modify. In an embodiment, these locations are chosen to be uniformly distributed across the dimension being processed. For example, again if the horizontal axis is being processed, if 12 pixels are to be added/deleted, 12 uniformly distributed pixel locations are located across the horizontal dimension of the image.

Other embodiments may choose more elaborate schemes, such as choosing locations where little or no "change" is occurring in the image along the dimension being processed. For example, if the horizontal axis of the image is being processed, 12 locations are chosen along the horizontal axis where the image exhibits the least amount of change along the horizontal dimension of the image, based on image data changes along that same direction. In this approach changes occurring horizontally, for an entire column, are combined to form a metric for each column of the image. The lack of change along the horizontal axis at the chosen location corresponds to a location in the image where the task of blending the two areas on either side of the location is easiest, because the adjacent horizontal data is similar in those regions. As such the chosen location is the "best" location for every column of pixels in the image. Specific embodiments of this particular approach are described in more detail further below with respect to FIG. 6. Regardless, referring to FIG. 3, in an embodiment, once the locations are chosen, a "width" of pixels about the location are chosen for removal from the image 303 and a "width" of pixels are constructed for insertion back into the image at that location 304, where, the differences between the two widths along with the total number of replacement locations establish the desired scaling.

Consistent with the example described previously, if 12 pixel locations are chosen uniformly across the horizontal width of the image, the difference between the width of the removed pixels and inserted pixels at any of these locations will be −1 pixel in the case of negative scaling and +1 pixel in the case of positive scaling. That is, for example, if negative scaling is to occur, the width of inserted pixels will be one pixel less than the width of the removed pixels for each block of the image. For example, if at each location a width of 3 pixels is removed and a width of 2 pixels is inserted, 12 pixels will be removed across the horizontal axis of the entire image (because 1 pixel has been removed at each of the 12 locations). By contrast, if positive scaling is to occur, the width of inserted pixels will be one pixel more than the width of the removed pixels. For example, if at each location a width of 2 pixels is removed and a width of 3 pixels is inserted, 12 pixels will be added across the horizontal axis of the entire image. This is because 1 pixel has been added at each of the 12 locations.

In one embodiment, alluded to in the example above, the respective widths of the inserted and removed pixels are implemented in combinations of 2 and 3 pixels. The width used, whether it should be 3 pixels or 2 pixels inserted and whether the width for the removed region used either 2 or 3 pixels respectively, define whether positive or negative scaling is being performed. If positive scaling is being performed, the added pixel width is 3 and the removed pixel width is 2. If negative scaling is being performed, the added pixel with is 2 and the removed pixel width is 3. Generally, the columns of image data that are added are based on the columns of image data that were removed.

The precise number of pixels that are removed and inserted can vary from embodiment. For example, another embodiment may choose combinations of 4 and 3 pixels, 5 and 4 pixels, 6 and 5 pixels, etc. Here, increasing the number of pixels involved in the pixel combinations corresponds to using larger region sizes for scaling modification which, in turn, corresponds to more processing resources being utilized to implement the scaling and in turn distributing the modified image data over a larger region thereby reducing the visibility of replacement image data in the context of the surrounding data. Each embodiment can choose the correct region size based on its own environment and corresponding constraints. Therefore tradeoffs exist between the quality requirements, available compute resources and possible scaling ratios. It should be appreciated that as the region size is increased the near unity scaling ratio is forced to be closer to one for positive and negative scaling. Furthermore, in the activity based implementation, the location selections are constrained because the candidate locations of contiguous blocks of image data having the required size are restricted. Further still, in alternate embodiments, the difference between the removed and added widths of pixels may be more than one pixel. For example, if negative scaling is to be performed, the removed width of pixels may be 6 pixels and the added width of pixels may be 4 pixels. This approach would cause the addition of 2 pixels per chosen location along the horizontal axis. As such, the number of selected locations would be 6 instead of 12 in the case where 12 pixels are to be added to the image across its horizontal axis. Here, using removal/insertion width combinations having differences of more than one pixel may make sense where, for example, the picture is very active (many changes) and intelligently choosing locations with little or no image activity is a challenge. Some printers may therefore be designed to choose fewer locations with greater removal/insertion width difference for more visually active images yet choose more locations with lesser removal/insertion width difference for less visually active images. Within a single image one might also choose to vary the widths, for example as a function of the image activity metric to reduce artifacts in areas which are more active by selecting a larger replacement block size for these regions and a small block size in areas having little activity As such, more generally, there is a relationship between the number of locations chosen along an axis for scaling modification, and, the number of pixels ultimately added to each chosen location for positive scaling or removed from each location for negative scaling. Specifically, the product of the number of chosen locations and the number of pixels ultimately added/removed at each chosen location will determine the total number of pixels that are added or removed along the entirety of the axis being processed. The total number of added or subtracted PELs is always known based on the required scaling and this should be matched as closely as feasible with the number of replacement locations. In the more complex case described above the block size for each replacement may be different as well as the number of modified pixels within each modified block. With the width of pixels for removal and addition at each chosen location being known, the aforementioned blending that is to occur within the width of pixels to be added can be effected.

Figure 4:
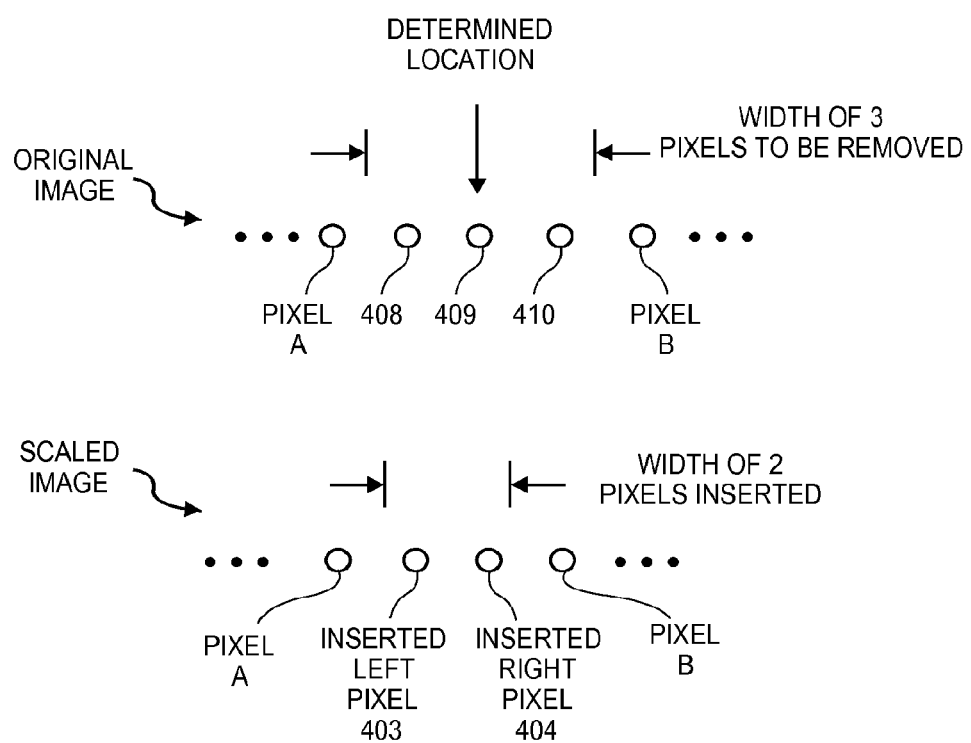
FIG. 4 shows weighting factors for a negative scaling process.

FIG. 4 shows weighting matrices 401, 402 for a negative scaling embodiment in which 3 pixels are to be removed at each chosen location and 2 pixels are to be added at each chosen location. The first weighting matrix 401 corresponds to the weighting matrix that is used to determine the value of the leftmost pixel 403 that is to be added to the image. The second weighting matrix 402 corresponds to the weighting matrix that is used to determine the value of the rightmost pixel 404 that is to be added to the image. The leftmost pixel 403 and the rightmost pixel 404 together correspond to the two pixels that are added to the image for a single row of image data. This is repeated for each row of data in the columns of pixels selected for removal. The resultant pixel values are quantized to the image bit depth and form the image data to be added to the scaled image instead of the three original columns of data. The total scaled image is constructed by repeating this process for all locations that must be modified thereby building the image in a piecewise fashion.

The columns of both weighting matrices correspond to the 3 pixels that are removed from the chosen location. For example, column location 405 corresponds to the leftmost pixel 408 that is removed from the image, column location 406 corresponds to the middle pixel 409 that is removed from the image and column location 407 corresponds to the rightmost pixel 410 that is removed from the image.

Each weighting matrix defines the coefficients c1,c2 and c3 for a linear equation of the form:

$$\text{Added\_pixel\_value} = c1^*(\text{leftmost\_removed\_pixel\_value}) + c2^*(\text{middle\_removed\_pixel\_value}) + c3^*(\text{rightmost\_removed\_pixel\_value})$$

As can be seen from the relationship above and the weighting matrices 401, 402 of FIG. 4, the left-most pixel value to be added will be a weighted combination of 67% of the value of the left-most pixel that was removed and 33% of the value of the middle pixel that was removed. By contrast, the right-most pixel value to be added will be a weighted combination of 67% of the value of the right-most pixel that was removed and 33% of the value of the middle pixel that was removed.

Thus, the value of the leftmost pixel to be added will be based mostly on the value of the leftmost pixel that was removed but will include some blending from the middle pixel that was removed. Similarly, the value of the rightmost pixel to be added will be based mostly on the value of the rightmost pixel that was removed but will include some blending from the middle pixel that was removed. Said another way, viewing the middle pixel of the pixels to be removed as "the" pixel that is eliminated from the image by way of the described 3 to 2 pel negative scaling process, a weighted average of the information from the eliminated pixel values is still retained in the information that is added back to the image at the chosen location and is evenly distributed. Weighted average scaling methods as described, provide high image quality having relatively low compute requirements to generate the replacement data for the image scaling.

Generating the replacement data on a distributed basis from the eliminated information improves upon the prior art linear process discussed above in the background section with respect to FIG. 1.

Figure 5:
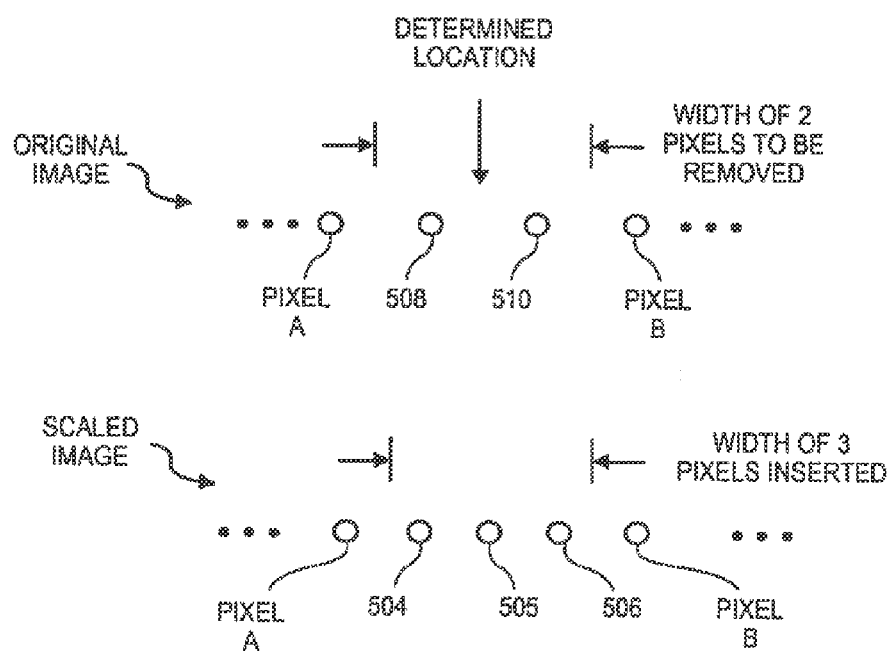
FIG. 5 shows weighting factors for a positive scaling process.

FIG. 5 shows weighting matrices for a positive scaling embodiment. In the case of the positive scaling embodiment of FIG. 5, at each chosen location, 2 pixel values within the image are removed and replaced with 3 new pixel values. The first weighting matrix 501 provides the coefficients of the linear formula that is used to determine the value of the leftmost pixel 504 that is to be added to the image, the second weighting matrix 502 provides the coefficients of the linear formula that is used to determine the value of the middle pixel 505 that is to be added to the image, the third weighting matrix 503 provides the coefficients of the linear formula that is used to determine the value of the rightmost pixel 506 that is to be added to the image (these linear formulas take the same form as the formula articulated above for negative scaling but with one fewer coefficient and input pixel value). This is repeated for every row of the image, using the same weighting matrix but operating on a different pair of pixels, to generate the corresponding three replacement pixels for each row of the image. The left column 507 of the weighting matrices 501, 502, 503 corresponds to the left pixel 508 that is removed from the image. The right column 509 of the weighting matrices 501, 502, 503 corresponds to the right pixel 510 that is removed from the image.

As can be seen from the specified weighting matrices, the value of the leftmost added pixel 504 is a combination of 66% of the value of the left pixel 508 that was removed and 33% of the value of the right pixel 510 that was removed, the value of the rightmost added pixel 506 is a combination of 66% of the value of the right pixel 510 that was removed and 33% of the value of the left pixel 508 that was removed, and, the value of the middle added pixel value 505 is a combination of 50% of the value of the left pixel 508 that was removed and 50% of the value of the right pixel 510 that was removed.

The rightmost added pixel value 506 takes on 33% of the value of the left removed pixel 508, and, the leftmost added pixel value 504 takes on 33% of the value of the right removed pixel. As such, again, information over a region that is removed from the image is blended over the region of information that is newly added to that region.

As such sharp distortions in the printed image should be largely avoided.

Recall from the discussion above, with respect to process 302 of FIG. 3, that more elaborate methods other than uniform distribution can be used to choose the specific locations in the image where a region of pixels is to be removed and then added to.

Figure 6:
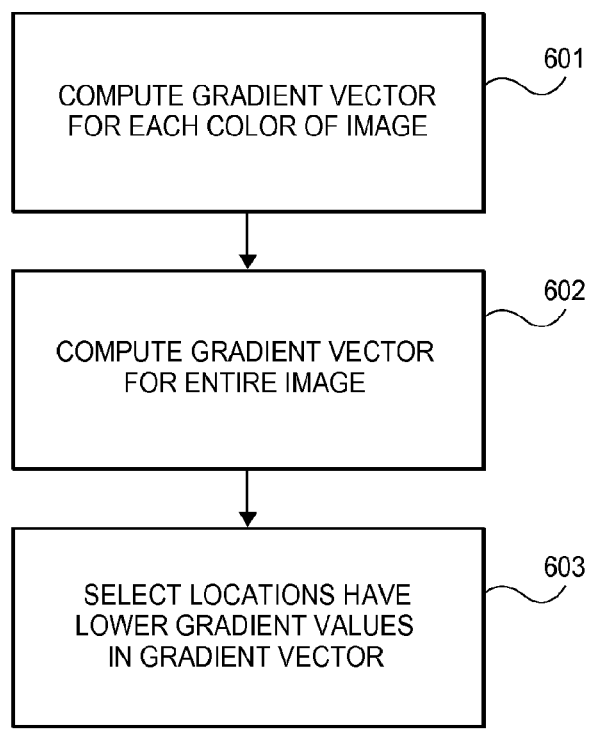
FIG. 6 shows a method for intelligently selecting image locations where scaling changes are to be made.

FIG. 6 pertains to such an improved approach where locations for insertion/deletion of regions of pixels are determined based on detected changes or "activity" in the image characterized by rapid changes of image data. The most relevant image "activity" is along the same direction as the scaling changes. According to the embodiment of FIG. 6, a gradient vector is determined for each color of the image 601. The gradient vector, in an embodiment, is a vector whose dimension corresponds to the number of columns in the image when the image is being processed along the horizontal axis.

According to one embodiment, again when the horizontal axis is being processed, a vector gradient is calculated for each row in the image ("row gradient") for the particular color of the image being processed, then, vector addition is performed on the set of row gradients (i.e., vector addition is performed over all rows of the image) to determine a final vector gradient for each column for that color. To determine the row gradient for any particular row, the value of each pixel for the color being processed is compared, in some fashion, to the values of one or more pixels that it neighbors.

In an embodiment, along each row of the image, each pixel is compared to both of its nearest neighbors and the absolute value of the difference between both neighbors is recorded in the pixel's position. Here, each pixel is compared against both its left neighbor and its right neighbor. For example, if the normalized pixel values for a particular row are as follows:

Row_1= . . . 0.001 0.002 0.004 0.001 the comparison against left neighbors will produce the following "left" gradient:

Row_1_Diff_L= . . . [N/A] 0.001 0.002 −0.003 while the comparison against right neighbors will produce the following "right" gradient:

Row_1_Diff$_{13}$ R= . . . −0.001 −0.002 0.003 [N/A] where [N/A] values are used at edges where adjacent pixels do not exist. If the absolute value of the elements in both the left vector and right vector is taken and the resultant vectors added together by way of vector addition, the following gradient for a single row results:

Row_1_gradient= . . . [N/A] 0.003 0.005 [N/A] Here, the Row_1_gradient vector above demonstrates that the third element in the sequence of normalized pixel values (having a value of 0.004 in the Row_1 vector) is "more different" with respect to its neighbors than the second element in the sequence of normalized pixel values (having a value of 0.002 in the Row_1 vector) is different with respect to its neighbors.

If a row gradient vector is calculated for every row in the image and then the set of row gradients are summed by way of vector addition, the resulting "gradient vector" will have an element for every column in the image where elements having higher values identify columns in the image whose corresponding pixels are most different than their neighbors while elements having lower values identify columns in the image whose corresponding pixels are least different than their neighbors.

The process is then repeated for every color in the image so that a set of gradient vectors is produced (one for gradient vector for every color). The set of gradient vectors is summed by vector addition for each color plane to produce a final gradient vector for the entire color image, where each element of the image gradient vector indicates the degree to which its column's pixels are different than its neighboring pixels when all colors of the image are considered 602. A further refinement would be to weight each color gradient vector by a factor proportional to the visibility of that color, before the vectors are summed for all color planes.

The columns whose pixels are least different than their neighbors across all colors of the image are then chosen 603 as the places where a block of pixels will be deleted and then replaced with columns of scaled data, to effect modest "near unity" scaling as described above.

Note that in various embodiments, the selected columns may be proximate to one another rather than uniformly dispersed, as limited by the block sizes of the data.

FIG. 7a shows an exemplary image of a person wearing a head-dress having a complex pattern of changing colors. FIG. 7b shows the gradient vector that is calculated for the image when the image is processed in the horizontal direction. As observed in FIG. 7b, the complex changes in the headdress portion of the image drive the gradient vector upward for the columns that contain pixels of the head-dress. By contrast, referring again to FIG. 7a, the color components of the background behind the person are relatively constant and unchanging. As such the columns whose pixels reside outside the person's shoulders have relatively low gradient vector values because there is little/no change in any of the color components of the background.

The column selection process will therefore choose columns outside the shoulder region to remove and add regions of pixels to effect modest scaling. Although the addition or subtraction of pixels in these regions changes the total image data to some extent, because such changes are inserted in regions of the image where the image itself demonstrates very little change, the changes should be practically undetectable to the human eye.

Note that depending on implementation or designer choice, some minimal distance may be placed between chosen columns so that some "spread" or distribution of selected columns is made across a wider region of the image. That is, some limitation is placed on how tightly the selected columns can be packed together. Such a limitation is observable in FIG. 7a as selected columns are not directly neighboring one another.

It is pertinent to point out that the discussions above for FIGS. 6 and 7a, b were in reference to a single axis (e.g., horizontal). The image can be processed by the above described processes serially in both directions, horizontal and then vertical. The scaling ratios are independent and hence they allow anamorphic scaling as well as the uniform case where the aspect ratio of the original image and the image after it has been scaled are the constant. Note that vertical application of the selection process of FIG. 6 to the image of FIG. 7a would cause rows over the person's head to be largely chosen from this region least activity (non-changing) color component mix when the image is viewed along the horizontal axis.

The above described gradient algorithm is just one of many possible mathematical approaches for indicating to what degree there is change occurring at a specific pixel location within an image. As just one alternative embodiment, for example, rather than taking only the nearest left and right neighbors of a particular pixel in calculating the gradient, instead a number of pixels to the left and right of the pixel can be used in the gradient analysis. The plurality of pixels may be weighted. For example, if the three leftmost and three rightmost pixels are used to determine the degree of change about a pixel, weighting factors such as 0.60 0.30 0.10 may be applied (0.6 is weighted to the closest pixel and 0.1 is weighted to the farthest pixel) to incorporate weighting into the determination of how much visual change is occurring in the neighborhood around a pixel, employing pixels that are not the pixel's nearest neighbor.

FIG. 8 illustrates one embodiment of a printer 800. Printer 800 includes print engine 810, control unit 820, image processor 830, and image reader 840. Print engine 810 includes the print heads that apply ink to a print medium (e.g., paper). In one embodiment, print engine 810 includes at least four print heads arranged in a fixed inkjet print head array. In a further embodiment, print heads associated with a single color are located within the same print head tray. The scaling processes described above may, in various embodiments, be implemented by any of the control unit 820 or image processor 830. The control unit 820 and/or image processor 830 may be implemented, wholly or partially, as a processor or other kind of circuit that executes program code.

Control unit 820 controls the operation of print engine 810, while image processor 830 performs rasterization of image data received at printer 800. Rasterization converts information received at printer 800 into a raster format. Particularly, image processor 830 generates a raster scan of a received image that is to be stored as scan line data in a memory array. Subsequently, image processor 830 performs halftone processing of the scan line data stored in the memory array. Control unit 820 also verifies the output of print engine 810 upon receiving image data captured by image reader 840.

Printer 800 also includes an alignment system 850. Alignment system 850 is implemented to provide alignment of print engine 810 associated with each individual ink color with respect to a reference position. In a further embodiment, alignment system 850 provides a framework for computing the magnitude of misalignment between color planes as produced by the print heads in fixed print head array arrangements. Although shown as residing a component of printer 800, other embodiments may feature alignment system 850 as an independent device, or combination of devices, that is communicably coupled to printer 800. The input to various implementation of near unity scaling problems exhibited by the aforementioned printouts may be addressed via from measurements by the alignment system 850. Specifically color plane registration and magnification in the cross web direction are relevant measurements that may be measured by the alignment system.

Control unit 820 may be implemented as a form of computing system having a central processing unit and associated system memory and non volatile storage. An exemplary computing system is depicted in FIG. 9. Control unit 820 may include various components of the computing system of FIG. 9.

FIG. 9 illustrates a computer system 900 on which printer 900 and/or alignment system 950 may be implemented. Computer system 900 includes a system bus 1020 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 925 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., an alphanumeric input device 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed:

1. A printer, comprising:
    a control unit and/or image processor to:
        determine a number of pixels by which to scale an image along a first axis of said image, wherein, scaling of said image is less than 10% of said image along said axis;
        identify locations in the image along said axis equal to said number of pixels by which to scale the image;
        remove a first region having a first width of more than one pixel from the image along said axis at each of said locations;
        insert a second region having a second width of more than one pixel into the image along said axis at each of said locations, wherein, an accumulated difference between pixels in the first pixel width and the second pixel width for said locations accounts for said number.

2. The printer of claim 1 wherein values of the inserted pixels are determined from a weighted combination of more than one of the removed pixels.

3. The printer of claim 1 wherein said remove and said insert are performed individually for each color of said image.

4. The printer of claim 1 wherein the control unit and/or image processor further:
    determine a second number of pixels by which to scale said image by a same scaling factor along a second axis of said image;
    identify second locations in the image along said second axis equal to said second number of pixels by which to scale the image;
    remove a third region having a third width of more than one pixel from the image along said second axis at each of said second locations;
    insert a fourth region having a fourth width of more than one pixels into the image along said second axis at each of said second locations, wherein, an accumulated difference between pixels in the third pixel width and the fourth pixel width for said second locations accounts for said second number.

5. The printer of claim 1 wherein the number of removed or inserted pixels is 3 and the number of the other removed or inserted pixels is 2.

6. The printer of claim 1 wherein said scaling is negative scaling such that more pixels are removed than inserted.

7. The printer of claim 6 wherein 3 pixels are removed along said axis at each of said locations and 2 pixels are added along said axis at each of said locations.

8. The printer of claim 1 wherein said scaling is positive scaling such that more pixels are inserted than removed.

9. The printer of claim 8 wherein 2 pixels are removed along said axis at each of said locations and 3 pixels are added along said axis at each of said locations.

10. A non-transitory machine readable medium containing program code that when processed by a processing unit cause the processing unit to perform a method, the method comprising:
    determining a number of pixels by which to scale said image along a first axis of said image, wherein, scaling of said image is less than 10% of said image along said axis;
    identifying locations in the image along said axis equal to said number of pixels by which to scale the image;
    removing a first region having a first width of more than one pixel from the image along said axis at each of said locations;
    inserting a second region having a second width of more than one pixel into the image along said axis at each of said locations, wherein, an accumulated difference between pixels in the first pixel width and the second pixel width for said locations accounts for said number.

11. The machine readable medium of claim 10 wherein said scaling is negative scaling such that more pixels are removed than inserted.

12. The machine readable medium of claim 10 wherein said scaling is positive scaling such that more pixels are inserted than removed.

13. The machine readable medium of claim 10 wherein values of the inserted pixels are determined from a weighted combination of more than one of the removed pixels.

14. The machine readable medium of claim 10 wherein said method further comprises:
    determining a second number of pixels by which to scale said image by a same scaling factor along a second axis of said image;
    identifying second locations in the image along said second axis equal to said second number of pixels by which to scale the image;
    removing a third region having a third width of more than one pixel from the image along said second axis at each of said second locations;
    inserting a fourth region having a fourth width of more than one pixels into the image along said second axis at each of said second locations, wherein, an accumulated difference between pixels in the third pixel width and the fourth pixel width for said second locations accounts for said second number.

15. The machine readable medium of claim 10 wherein the number of removed or inserted pixels is 3 and the number of the other removed or inserted pixels is 2.

16. A method of scaling an image, comprising:
    determining a number of pixels by which to scale said image along a first axis of said image, wherein, said scaling of said image is less than 10% of said image along said axis;
    identifying locations in the image along said axis equal to said number of pixels by which to scale the image;
    removing a first region having a first width of more than one pixel from the image along said axis at each of said locations;

inserting a second region having a second width of more than one pixel into the image along said axis at each of said locations, wherein, an accumulated difference between pixels in the first pixel width and the second pixel width for said locations accounts for said number.

17. The method of claim 16 wherein values of the inserted pixels are determined from a weighted combination of more than one of the removed pixels.

18. The method of claim 16 wherein said removing and said inserting are performed individually for each color of said image.

19. The method of claim 16 wherein said method further comprises:
   determining a second number of pixels by which to scale said image by a same scaling factor along a second axis of said image;
   identifying second locations in the image along said second axis equal to said second number of pixels by which to scale the image;
   removing a third region having a third width of more than one pixel from the image along said second axis at each of said second locations;
   inserting a fourth region having a fourth width of more than one pixels into the image along said second axis at each of said second locations, wherein, an accumulated difference between pixels in the third pixel width and the fourth pixel width for said second locations accounts for said second number.

20. The method of claim 16 wherein said scaling is negative scaling such that more pixels are removed than inserted.

* * * * *